United States Patent [19]

Bargeron et al.

[11] 4,277,045
[45] Jul. 7, 1981

[54] LIQUID SPRING STANCHION

[76] Inventors: Thomas C. Bargeron, 3832 Williamsburg Cir., Birmingham, Ala. 35243; Stanley T. Moodie, 3300 Burningtree Dr., Birmingham, Ala. 35226

[21] Appl. No.: 953,915

[22] Filed: Oct. 23, 1978

[51] Int. Cl.³ .............................................. F16M 13/00
[52] U.S. Cl. ..................................... 248/599; 248/356; 248/542
[58] Field of Search ...................... 248/55, 354 S, 356, 248/542, 599, 600, 601; 267/64 A

[56] References Cited

U.S. PATENT DOCUMENTS

| 306,581 | 10/1884 | Chase | 248/600 X |
|---|---|---|---|
| 1,892,380 | 12/1932 | Brevick | 248/601 |
| 2,540,525 | 2/1951 | Howarth et al. | 248/542 X |
| 2,863,508 | 12/1958 | Taylor | 267/64 A X |
| 2,947,556 | 8/1960 | Wenger | 248/161 X |
| 2,983,176 | 5/1961 | Taylor | 267/64 A X |
| 3,000,600 | 9/1961 | Suozzo | 248/542 |
| 3,963,205 | 6/1976 | Hagman | 248/55 |

Primary Examiner—William H. Schultz
Attorney, Agent, or Firm—B. P. Fishburne, Jr.

[57] ABSTRACT

A stanchion for the support of heavy industrial structures and pipe lines utilizes internal liquid springs for the sake of compactness. The height of the stanchion is standardized within several load ranges for ease of installation. The device is field adjustable to achieve an exact height. The stanchion has a low profile and for stability its height is always less than its base dimension. The stanchion includes a structural bearing active in two right angular planes and the bearing surfaces are of a dry lube type to resist wear. An integral load indicating scale is included on the stanchion. Economy of manufacturing, strength and simplicity of design are achieved.

4 Claims, 4 Drawing Figures

LIQUID SPRING STANCHION

BACKGROUND OF THE INVENTION

The invention relates to that class of support device used to support large industrial structures such as power plant precipitators, associated ducting, pipe lines and other structures which are subject to deflection or slight movement caused by thermal expansion. Commonly, in the prior art, some form of structural bearing is installed at main support points for the equipment. Such bearings are generally customized and differ in design. Some include spring means active along the axis of the load and/or some form of slide bearing to compensate for lateral movements and deflections. Such customized bearing means are frequently complex and costly and there is a lack of uniformity in the design of supports for large structures, generally speaking.

The objective of this invention is to eliminate the main deficiencies of the prior art and to provide a vastly improved stanchion of compact design and substantially constant height for all capacities, thereby standardizing the stanchion and substantially eliminating the need for customizing to accommodate various structures requiring support.

A further objective is to provide a stanchion which is field adjustable as to height within narrow limits, has a low profile and a wide stable base, as well as integral sliding structural bearing means active against axial loading and lateral loading. The structural bearing means features low friction dry lube bearing surfaces exclusively. Internal commercial liquid spring units in required numbers are employed for compactness.

Other objects and advantages of the invention will become apparent during the course of the following detailed description.

The following prior United States patents are made of record herein under 37 C.F.R. 1.56, and these patents while broadly relevant to the invention do not disclose the previously-discussed features of the instant invention:

| | |
|---|---|
| 2,904,328 | 3,349,418 |
| 3,186,702 | 3,504,905 |
| 3,204,945 | 3,610,605 |
| 3,243,236 | 3,933,344 |
| 3,282,543 | 3,998,499 |
| 3,296,349 | 4,006,505 |
| 4,025,676. | |

DETAILED DESCRIPTION

Figure 1:
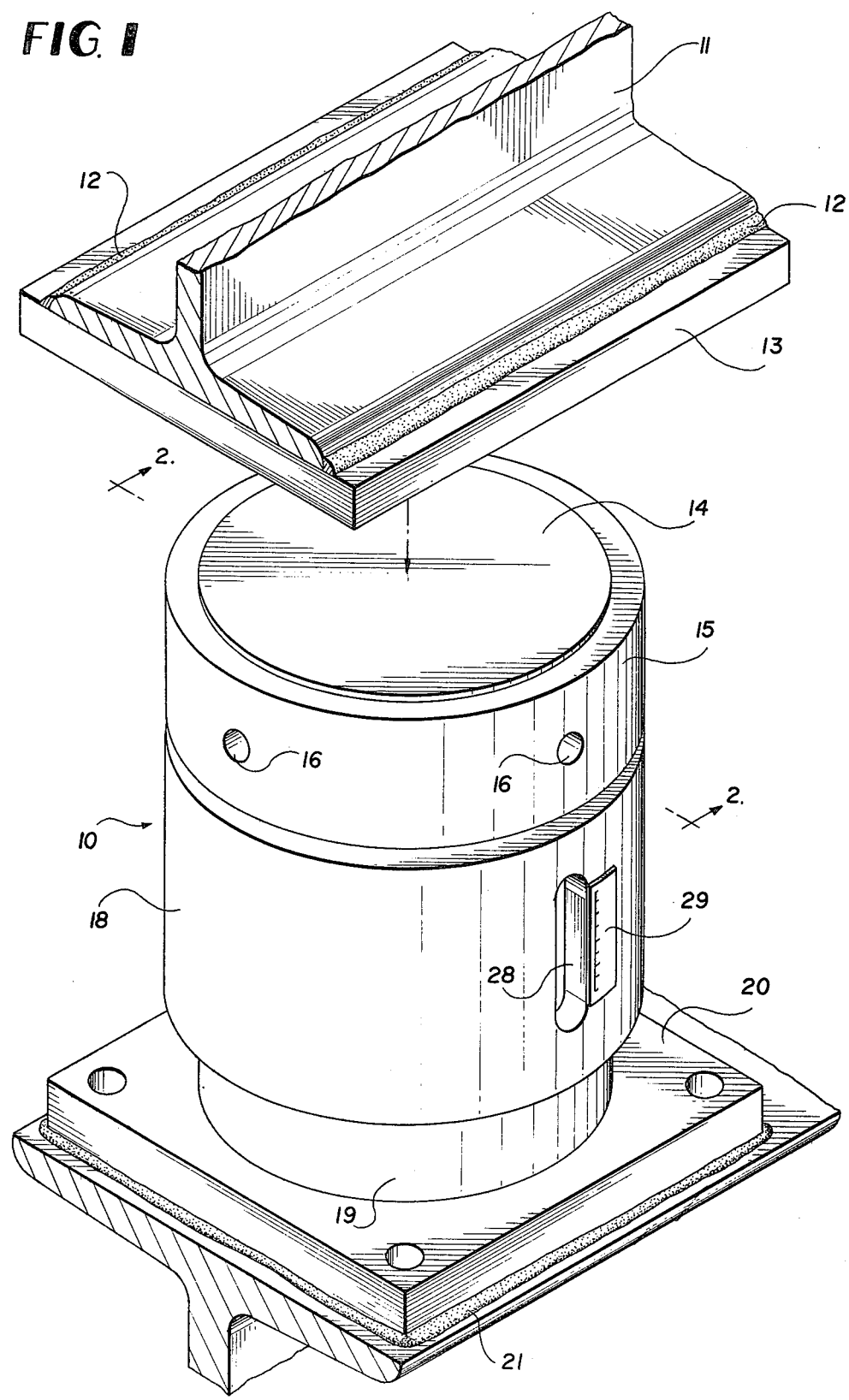
FIG. 1 is a partly exploded and partly cross sectional perspective view of a low profile liquid spring stanchion embodying the invention.
Figure 2:
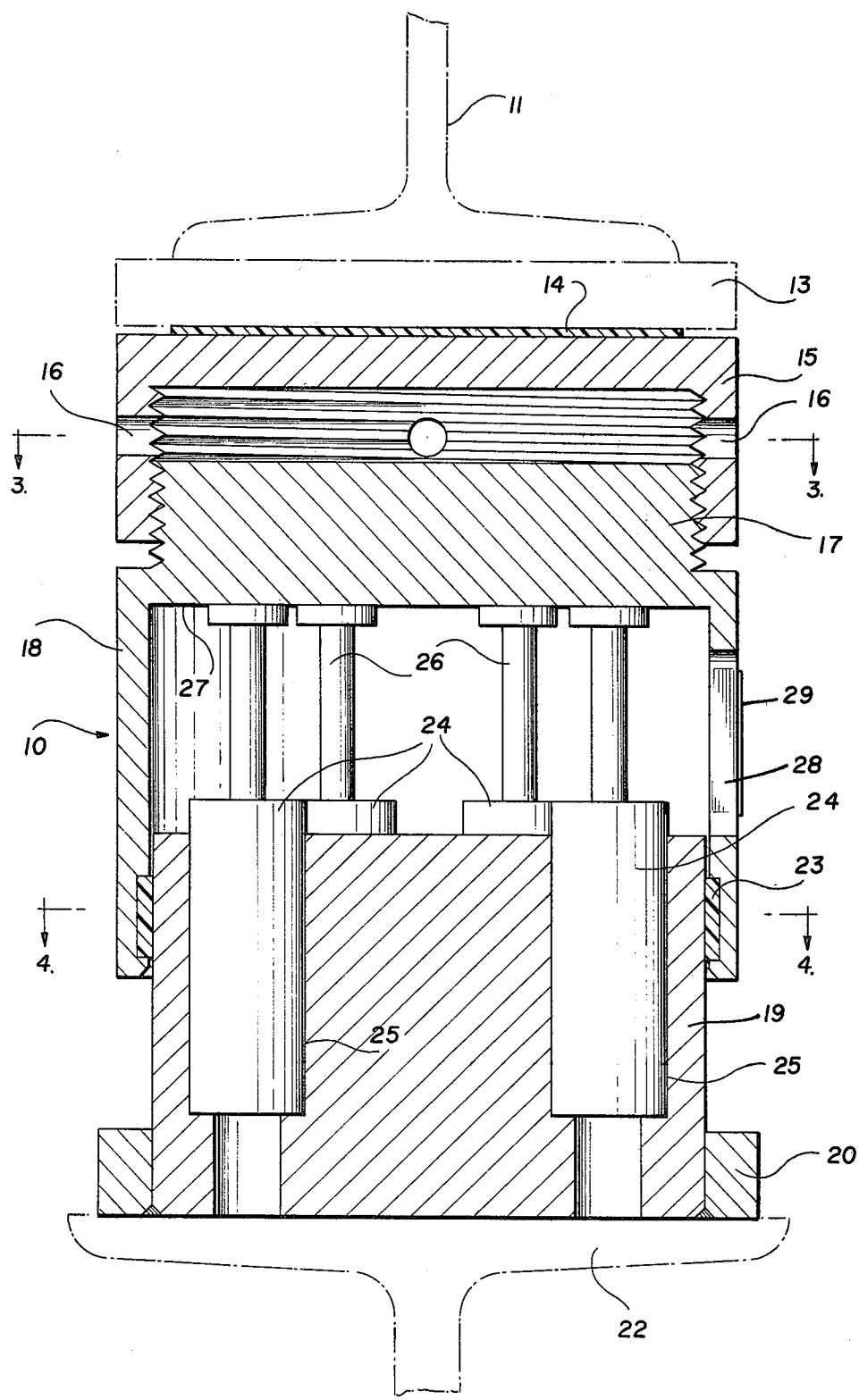
FIG. 2 is a central vertical section through the stanchion taken on line 2—2 of FIG. 1.
Figure 3:
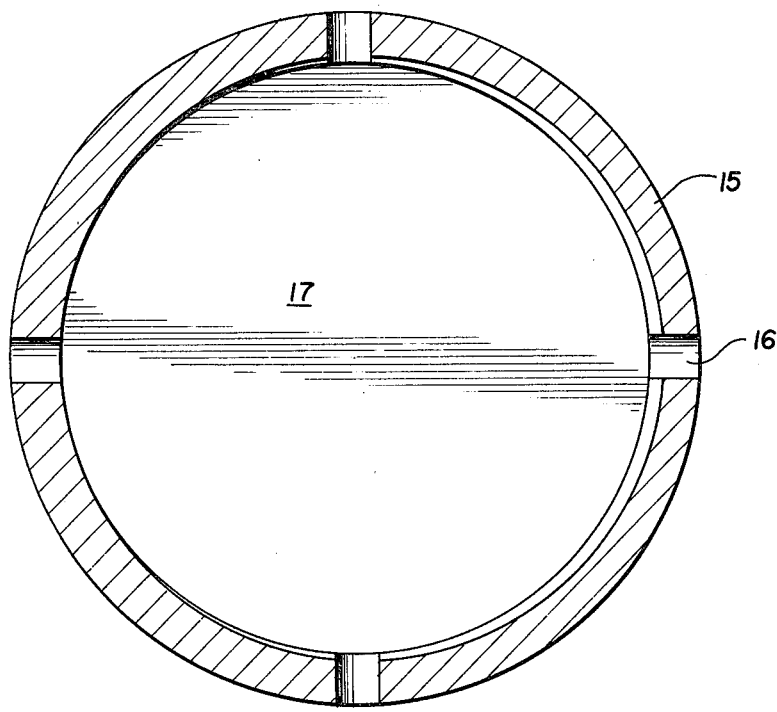
FIG. 3 is a horizontal section taken on line 3—3 of FIG. 2.
Figure 4:
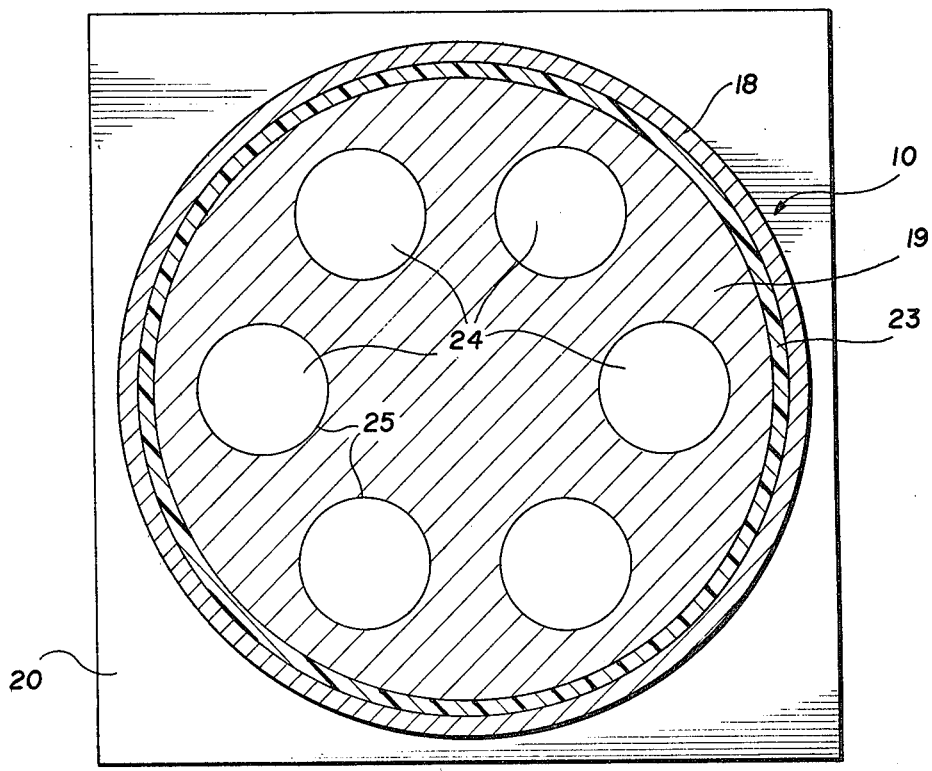
FIG. 4 is a horizontal section taken on line 4—4 of FIG. 2.

Referring to the drawings in detail wherein like numerals designate like parts, a liquid spring stanchion 10 embodying the invention is utilized to support a heavy structure, such as a power plant precipitator or the like. Such structure to be supported possesses a structural member 11 which can be welded as at 12 to a top plate 13 which preferably has a stainless steel facing on its lower side to facilitate sliding on an underlying top dry lube bearing pad 14 of the stanchion 10. The bearing pad 14 is preferably a PTFE dry lube bearing pad or a pad formed of some equivalent dry lube bearing material.

The dry lube bearing pad 14 is subjected to the direct thrust load of the supported equipment which it transmits axially to the stanchion 10. The top plate 13, through its bottom stainless steel facing, may slide on the bearing pad 14 as required due to stress forces, vibration or thermal expansion causing some movements of the supported equipment.

While the stanchion 10 has a standardized or constant height for a given load range, its exact height at the installation site is adjustable by operation of an upper adjusting nut or cap 15 having side openings 16 to accept a wrench or another turning tool. The adjusting nut 15 has threaded engagement with an upstanding short adjusting screw extension 17 rising from the top of a stanchion cover 18 or sleeve. The cover 18 engages telescopically over a sturdy base pedestal 19 having an attached wide mounting plate 20 whose width is preferably in excess of the height of the stanchion 10 for stability against upsetting. The mounting plate 20 at the base of the stanchion may be bolted or welded as at 21 to an underlying structural support member 22 of the equipment.

To resist lateral forces, a dry lube preferably PTFE bearing strip 23 is interposed between the periphery of pedestal 19 and the cover member 18. This dry lube bearing strip facilitates axial relative movements between the components 19 and 18 which occur under loading conditions. It may be noted here that, while the stanchion 10 is illustrated as cylindrical, it can be rectangular or some other non-circular shape in cross section without effecting its mode of operation.

To support and cushion the load on the stanchion 10, it is provided internally with a suitable number of conventional liquid springs 24 whose housings are received in cavities 25 formed in the base or pedestal 19 in equidistantly spaced relationship. The liquid springs 24 are commercial items which need not be described in detail. One well-known liquid spring is a Taylor liquid spring designated 6232. Other commercially available liquid springs of an equivalent type may be used. The stems 26 of the several liquid springs bear against a flat top face 27 of the stanchion cover 18 defining the bottom of the adjusting screw 17. The liquid springs 24 have an adjustable spring rate.

The stanchion has a further convenience feature in the form of a load indicator 28 having a graduated scale 29 on the side wall of the cover 18. The scale 29 can indicate the load range or capacity of a given stanchion and the actual load thereon.

It may now be seen that the stanchion is quite simple in construction, compact and possesses a low profile rendering it very stable. It has built-in structural bearing means, is finely adjustable as to height, and utilizes liquid springs to promote compactness and because of other known advantages inherent in such springs. The stanchion makes possible a more-or-less standardized support for a wide variety of large industrial structures and applications without the necessity for expensive customized supports in each application. The advantages of the device over the known prior art should now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A stanchion comprising a base member adapted to be fixedly secured to an underlying support, a cover member telescopically engaged with the base member and extending thereabove, the cover member having a chamber above the base member, liquid spring means engaged in the base member and projecting thereabove and into said chamber and engaging a top wall of said chamber, a screw-threaded extension rising from said cover member, a coacting adjusting nut on said screw-threaded extension and having a top bearing surface for sliding engagement with a plate member attached to an overhead structure which the stanchion is adapted to support, and a bearing to resist lateral forces on the stanchion disposed between the telescopically engaging portions of said base member and said cover member, and said last-named bearing comprising a strip of dry lube bearing material held within an internal recess of the telescoping portion of the cover member.

2. A stanchion as defined in claim 1, and said liquid spring means comprising plural liquid spring units engaged within cavities of said base member in spaced relationship to collectively resist the load on said stanchion.

3. A stanchion as defined in claim 1, and said base member comprising a substantially solid body portion having top opening cavities receiving the liquid spring means and also having a lower end wide mounting plate adapted to be bolted or welded to an underlying support, and the cover member having a skirt portion beneath said screw-threaded extension telescopically engaged over the solid body portion of the base member.

4. A stanchion comprising a substantially solid base member adapted to be fixed to an underlying support, a hollow cover member telescopically engaged over the solid base member and extending thereabove to define a chamber above the base member, load bearing spring means within said chamber, a threaded extension rising from the cover member, a coacting adjusting cap having screw-threads on said extension and including a top dry lube bearing surface for sliding contact with an overhead structure being supported, said cap having diametrically arranged turning tool engaging elements whereby the height of the cap is easily adjusted, and a dry lube bearing strip to resist lateral forces disposed between the telescopically engaging parts of the base member and cover member and being held in a recess formed in the cover member.

* * * * *